(12) United States Patent
Durrant

(10) Patent No.: US 10,866,366 B2
(45) Date of Patent: Dec. 15, 2020

(54) OPTICAL FIBER STUB HAVING A DEMOUNTABLE RECEPTACLE CAP WITH AN ALIGNMENT SLEEVE

(71) Applicant: Optical Fiber Packaging, Ltd., Haverhill (GB)

(72) Inventor: Richard C. E. Durrant, Crystal Lake, IL (US)

(73) Assignee: Optical Fiber Packaging, Ltd., Haverhill (GB)

( * ) Notice: Subject to any disclaimer, the term of this patent is extended or adjusted under 35 U.S.C. 154(b) by 0 days.

(21) Appl. No.: 16/740,434

(22) Filed: Jan. 11, 2020

(65) Prior Publication Data

US 2020/0150352 A1 May 14, 2020

Related U.S. Application Data

(63) Continuation-in-part of application No. 16/572,725, filed on Sep. 17, 2019.

(60) Provisional application No. 62/732,493, filed on Sep. 17, 2018.

(51) Int. Cl.
*G02B 6/38* (2006.01)
(52) U.S. Cl.
CPC .......... *G02B 6/3846* (2013.01); *G02B 6/381* (2013.01)

(58) Field of Classification Search
CPC .... G02B 6/3846; G02B 6/381; G02B 6/3874; G02B 6/3861
See application file for complete search history.

(56) References Cited

U.S. PATENT DOCUMENTS

| | | | | |
|---|---|---|---|---|
| 5,363,461 A | * | 11/1994 | Bergmann | G02B 6/3846 385/78 |
| 6,536,956 B2 | * | 3/2003 | Luther | G02B 6/3885 385/86 |
| 2003/0021548 A1 | * | 1/2003 | Luther | G02B 6/3885 385/86 |
| 2014/0355936 A1 | * | 12/2014 | Bund | G02B 6/3802 385/81 |
| 2020/0088957 A1 | * | 3/2020 | Durrant | G02B 6/3846 |
| 2020/0150352 A1 | * | 5/2020 | Durrant | G02B 6/3846 |

* cited by examiner

*Primary Examiner* — Andrew Jordan
(74) *Attorney, Agent, or Firm* — Chicago IP Law; Steven M. Evans

(57) ABSTRACT

An optical fiber stub having a first end and a second end, wherein the outer surface of the first end has a threaded surface, and a stop surface at a base of the outer threaded surface, a receptacle cap having a tubular body with a base end and a receiving end, wherein an inner surface of the base end is similarly threaded to the outer threaded surface of the first end, so that the base end of the receptacle cap can be screwed over and around the first end of the optical fiber stub. The receiving end of the receptacle cap includes two opposing flat surfaces on an outer surface of the receiving end, so as to enable a tool to grip the outer surface of the receiving end of the receptacle cap and unscrew the receptacle cap from the optical fiber stub.

3 Claims, 6 Drawing Sheets

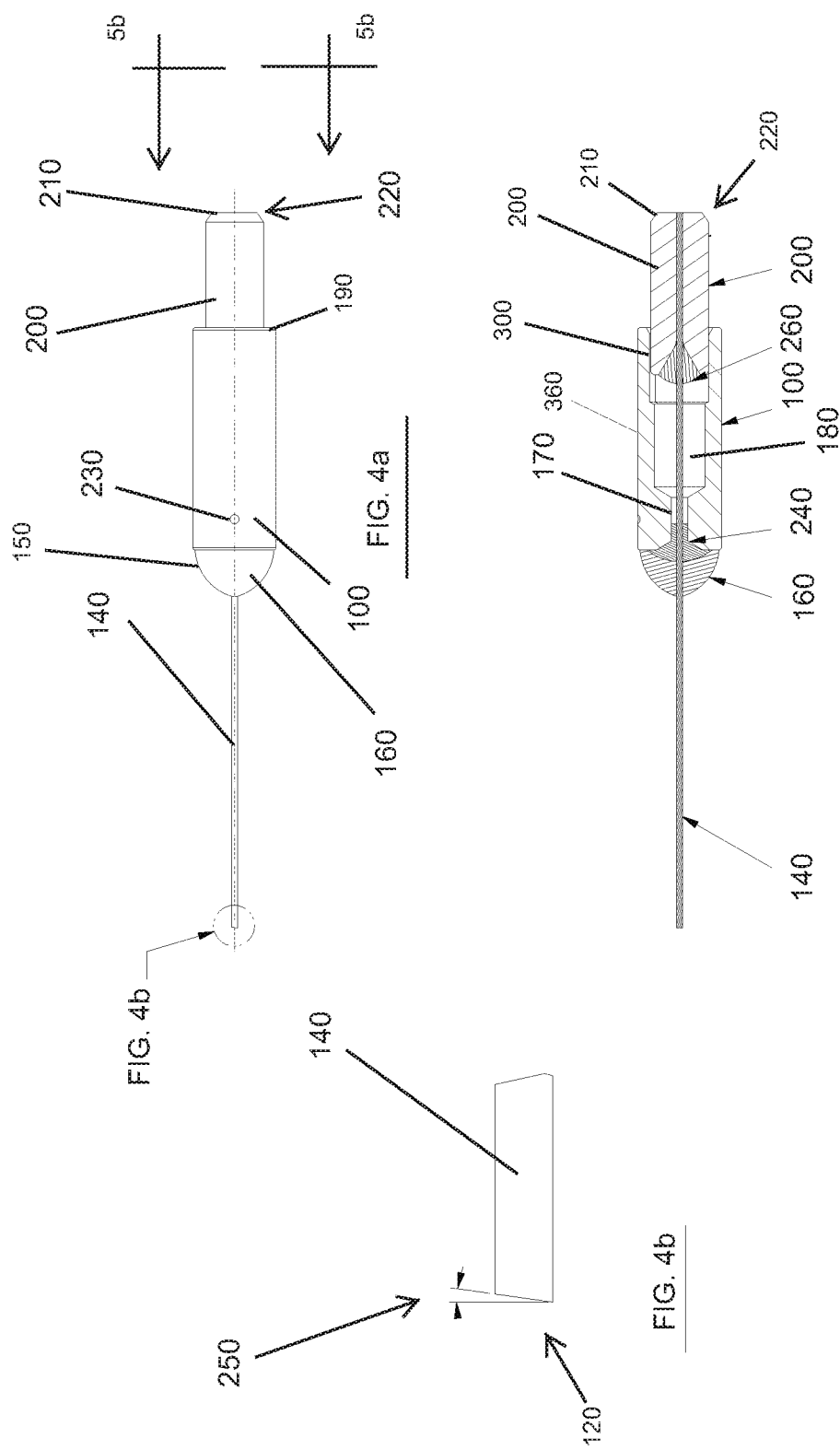

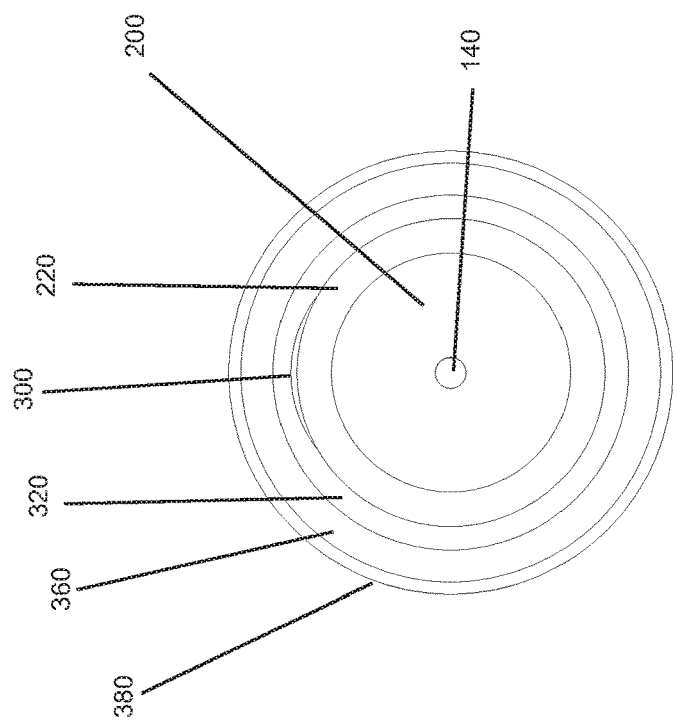
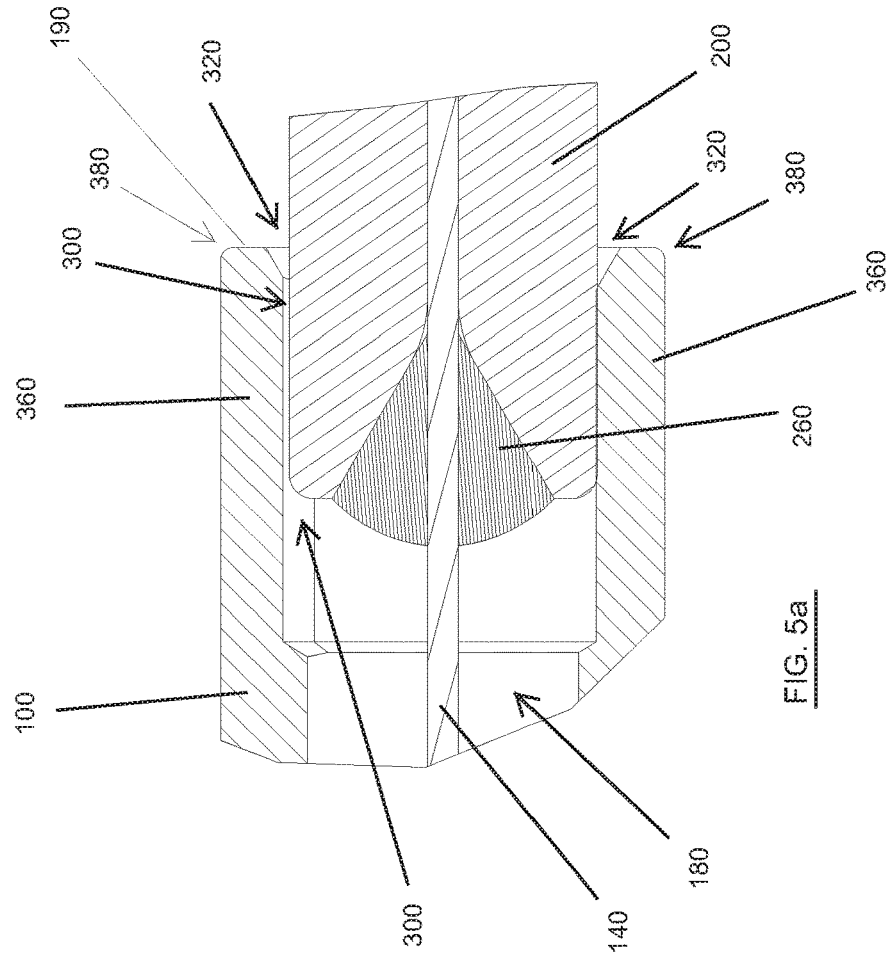
FIG. 5b
FIG. 5a

OPTICAL FIBER STUB HAVING A DEMOUNTABLE RECEPTACLE CAP WITH AN ALIGNMENT SLEEVE

CROSS-REFERENCE TO RELATED APPLICATIONS

This application is a Continuation-in-Part of application Ser. No. 16/572,725, filed on Sep. 17, 2019, which claims priority to provisional application 62/732,493, filed on Sep. 17, 2018. Each of the applications referenced immediately above in this paragraph are herein incorporated by reference.

BACKGROUND OF THE INVENTION

Field of the Invention

The present invention relates generally to optic fiber connectors, and more particularly, to receptacles for optical fiber stubs.

Description of Related Art

Optical fiber stubs are used in telecommunication systems and devices for systems such as for Transmit Optical Sub Assemblies (TOSAs) and Receiving Optical Sub Assemblies (ROSAs). A fiber stub has two ends, wherein one end includes an optical fiber mounted within a ferrule or connector interface. Normally the opposing end of an optical fiber stub has the fiber coupled directly or indirectly to an emitter or receiver electrooptic device, which is located within the optoelectronic module. The optical fiber includes both a core and a cladding. The optical fiber includes glass materials with several refractive indices, typically one with a higher numerical aperture that clads to another at the core of the fiber.

After an optical fiber stub is secured adjacent to a TOSA or ROSA within an electronic device using such optical devices, a receptacle cap typically is glued or welded to be permanently secured over the optical fiber stub. The receptacle cap includes an alignment sleeve for coupling and properly positioning an external optical ferrule containing an optical fiber adjacent to the optical fiber stub for efficient transmission of optical signals between the external optical ferrule and the optical fiber stub.

During assembly, testing, and interchanging external optical ferrules within the alignment sleeve of the receptacle cap, dirt or other impurities and occasional mechanical damage, can accumulate or occur on the outer end or end face of the optical fiber stub, thus negatively affecting the ability of the optical fiber to transmit or receive optical signals. Since the receptacle cap conventionally is permanently secured over the optical fiber stub, it can be very difficult to clean or re-polish to repair the outer end of the optical ferrule of the optical fiber stub. Since an electronic device utilizing optical fiber stubs can be expensive, reduced performance of an optical fiber stub due to contamination of the outer end of the optical ferrule of the optical ferrule stub that is permanently covered by a receptacle cap can have serious negative consequences.

Accordingly, there is a need for a design that enables the end face of an optical ferrule of an optical fiber stub covered by a receptacle cap to be easily accessible for cleaning, while maintaining proper alignment of an alignment sleeve within the receptacle cap relative to the optical fiber stub.

ASPECTS AND SUMMARY OF THE PRESENT INVENTION

One aspect of the present invention is to provide a removable receptacle cap for an optical fiber stub to enable the end face of the optical ferrule of the optical fiber stub to be easily cleaned or re-polished without damaging the optical fiber stub or the electronic apparatus to which the optical fiber stub is secured.

Another aspect of the present invention is to reduce manufacturing and repair costs.

In order to achieve these and other aspects, the present invention provides an optical fiber stub assembly, comprising a stub body having a first end and a second end, wherein an outer surface of the first end is threaded, and a stop surface is located at an end of the outer threaded surface of the first end. A receptacle cap having a tubular body with a base end and a receiving end, wherein an inner surface of the base end is similarly threaded to mate with the outer threaded surface of the first end, so that the base end of the receptacle cap can be screwed over and around the first end of the stub body. The receiving end of the receptacle cap includes two opposing flat surfaces on an outer surface, so as to enable a tool to grip the outer surface of the receiving end of the receptacle cap and unscrew the receptacle cap from the stub body. An alignment sleeve is located within the receptacle cap for receiving and properly positioning an optical ferrule relative to an end face of the optical ferrule of the stub body.

Another aspect of the invention disclosed herein is enable gases created during the sealing process used with hermetic version, if the fiber stub is to be glass sealed at one end, to escape without damaging the hermeticity of the glass seal itself.

A further aspect of the present invention is to produce resilient hermetic seals in hermetic fiber stubs.

In order to achieve these and other aspects, another embodiment of the present invention provides a vent or slot between the ferrule and stub body that enables gases generated from the low melting glass sealing process of an optical fiber to the ferrule stub to escape, thus creating a stronger and more resilient and reliable seal between the optical fiber and low melting point glass and the stub body, creating the hermetic seal. Without such a vent, which is the conventional configuration, generated gases are forced into the molten glass during the sealing process, thus reducing the strength or resilience of the hermetic seal.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIG. 1a is a cross-sectional view of the optical fiber stub and demountable receptacle cap shown in FIG. 1;

FIG. 1b is an end view of the demountable receptacle cap shown in and taken along line 1b-1b of FIG. 1;

FIG. 1c is an enlarged cross-sectional view of the threaded outer surface of the first end of the stub body and the threaded inner surface of the base end of the receptacle cap shown in FIG. 1a;

FIG. 4a is a side view of a hermetic stub fiber body, ferrule, and optical fiber configured in accordance with another embodiment of the present invention;

FIG. 4b is an enlarged view of the tip of the optical fiber shown in FIG. 4a;

FIG. 4c is a cross-sectional view of the hermetic stub fiber body, ferrule, and optical fiber shown in FIG. 4a;

FIG. 5a is an enlarged cross-sectional view of the mechanical interface configuration between the ferrule and fiber stub body shown in FIG. 4c;

FIG. 5b is an enlarged end view of the hermetic stub fiber assembly shown in and taken along line 5b-5b of FIG. 4a; and FIG. 6 is a cut away view of the hermetic stub fiber body, ferrule, and optical fiber shown in FIG. 4a.

DETAILED DESCRIPTION OF THE PREFERRED EMBODIMENTS

Figure 1:
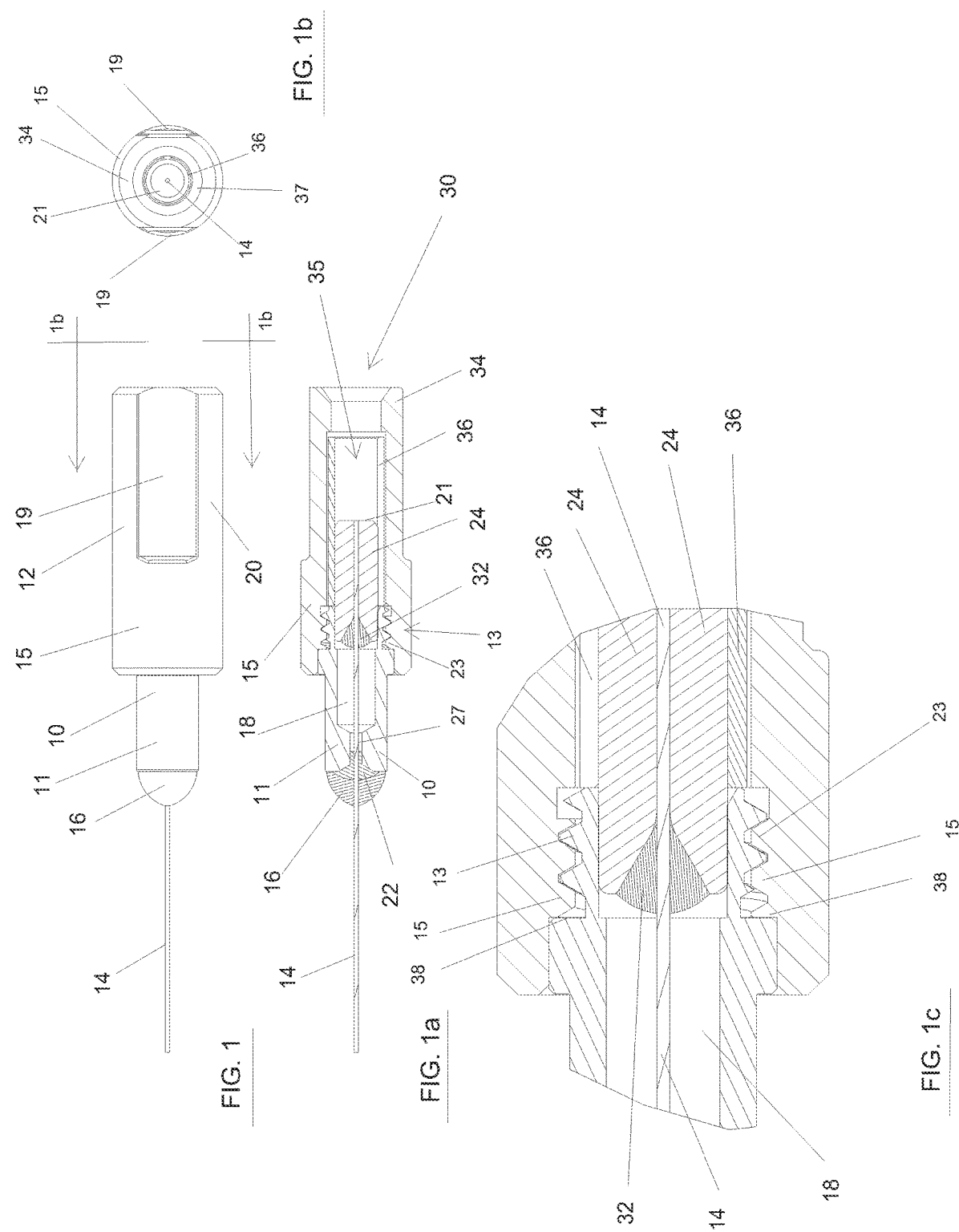
FIG. 1 is a side view of an optical fiber stub having a demountable receptacle cap with an alignment sleeve configured in accordance with the present invention.

Referring now to the drawings, FIG. 1 is a side view of an optical fiber stub 10 connected to a receptacle cap 12 configured in accordance with a first embodiment of the present invention. An optical fiber 14 is shown exiting a second end 11 (FIG. 1a) of the optical fiber stub 10. The second end 11 of the optical fiber stub 10 includes support resin 16 for supporting the optical fiber 14 within the second end 11 of the optical fiber stub 10. The support resin 16 is applied on top of a low melting point glass seal 22 (FIG. 1a) to support the mechanical transition of the optical fiber 14 exiting the glass seal 22. Without the support resin 16 the glass seal 22 and the optic fiber 14 transition or connection would be prone to breakage. Further illustrated is one of the two opposing flat surfaces 19 on the outer surface 20 of the receptacle cap 12.

FIG. 1a is a cross-sectional view of the optical fiber stub 10 shown in FIG. 1. Illustrated are the optical fiber 14 and the support resin 16 for the glass hermetic seal 22. The support resin 16 is typically used to mechanically support the transition of the optic fiber 14 to air from the hard glass seal 22. Further illustrated in FIG. 1a is the optical fiber 14 extending completely through the optical fiber stub 10 and to the outer end 21 of the optical ferrule 24.

A pass-through or channel 27 is provided into which the optical fiber 14 is typically hermetically sealed with the glass seal 22, for example, which is low melting point glass. An inner chamber 18 is shown within the optical fiber stub 10. Further illustrated is the epoxy resin 32 used for optical fiber termination within the ferrule 24. The optical fiber 14 passes through the support resin 16, the glass seal 22, the channel 27, the inner chamber 18, and the optical ferrule 24. The hermetic glass seal 22 forms a hermetic seal around the optical fiber 14 between the support resin 16 and in the channel 27.

The ferrule tip or end 21 may have a chamfer for easier insertion into the receptacle cap 12. The first end 13 of the optical fiber stub 10 is located within the base end 15 of the receptacle cap 12. The end-face 21 of the ferrule 24 and the optical fiber 14, which is glued within the ferrule 24, are both typically polished to a fine finish to allow an efficient optical connection to another connector interface via a split sleeve arrangement.

In accordance with the present invention, the first end 13 of the optical fiber stub 10 is located within the base end 15 of the receptacle cap 12. Further, in accordance with the present invention, the outer surface 17 of the first end 13 of the optical fiber stub 10 is threaded, and the inner surface 23 of the base 15 of the receptacle cap 12 is threaded to mate with the threading 17 of the first end 13 optical fiber stub 10. In this manner the receptacle cap 12 can be screwed around and over the first end 13 of the optical fiber stub 10. The receptacle cap 12 can be unscrewed from the optical fiber stub 10 in order to expose the end face or outer end 21 of the optical ferrule 24 and optical fiber 14 for easily cleaning or polishing without damaging the apparatus to which the optical fiber stub 10 is mounted.

Also illustrated in FIG. 1a is the opening 30 on the receiving end 34 of the receptacle cap 12. The opening 30 enables an optical ferrule to be inserted into the inner tube 35 of the receptacle cap 12. An alignment sleeve 36, preferably constructed of a ceramic material, is mounted and effectively axially retained within the inner surface of the receptacle cap 12. The alignment sleeve 36 functions to properly position and align an optical ferrule inserted in the inner tube 35 via the opening 30.

FIG. 1b is an end view of the opening 30 of the receptacle cap 12 shown in and taken along line 1b-1b of FIG. 1. Illustrated are the flat surfaces 19 on the outer surface of the receiving end 34 of the receptacle cap 12. Also illustrated are the outer perimeter of the base end 15 of the receptacle cap 12, the end face 21 of the optical ferrule 24 containing the optical fiber 14, and the alignment sleeve 36. The sloped edge 37 (FIG. 2) on the opening 30 is shown too.

FIG. 1c is an enlarged view first end 13 of the optical fiber stub 10 and the base end 15 of the receptacle cap 12 shown in FIG. 1a. Also illustrated are the optical fiber 14, the inner chamber 18, the epoxy resin 32, the optical ferrule 24, and the alignment sleeve 36.

In accordance with a first embodiment of the present invention, the outer surface 17 of the first end 13 of the optical fiber stub 10 is threaded, and the inner surface 23 of the base end 15 of the receptacle cap is threaded to a matching size, thus enabling the base end 15 of the receptacle cap 12 to the screwed on and over the first end 13 of the optical fiber stub 10. The first end 13 of the optical fiber stub 10 include a stop plate 38 to terminate the rotation of the base end 15 of the receptacle cap 12 over the first end 13 of the optical fiber stub 10.

Figure 2:
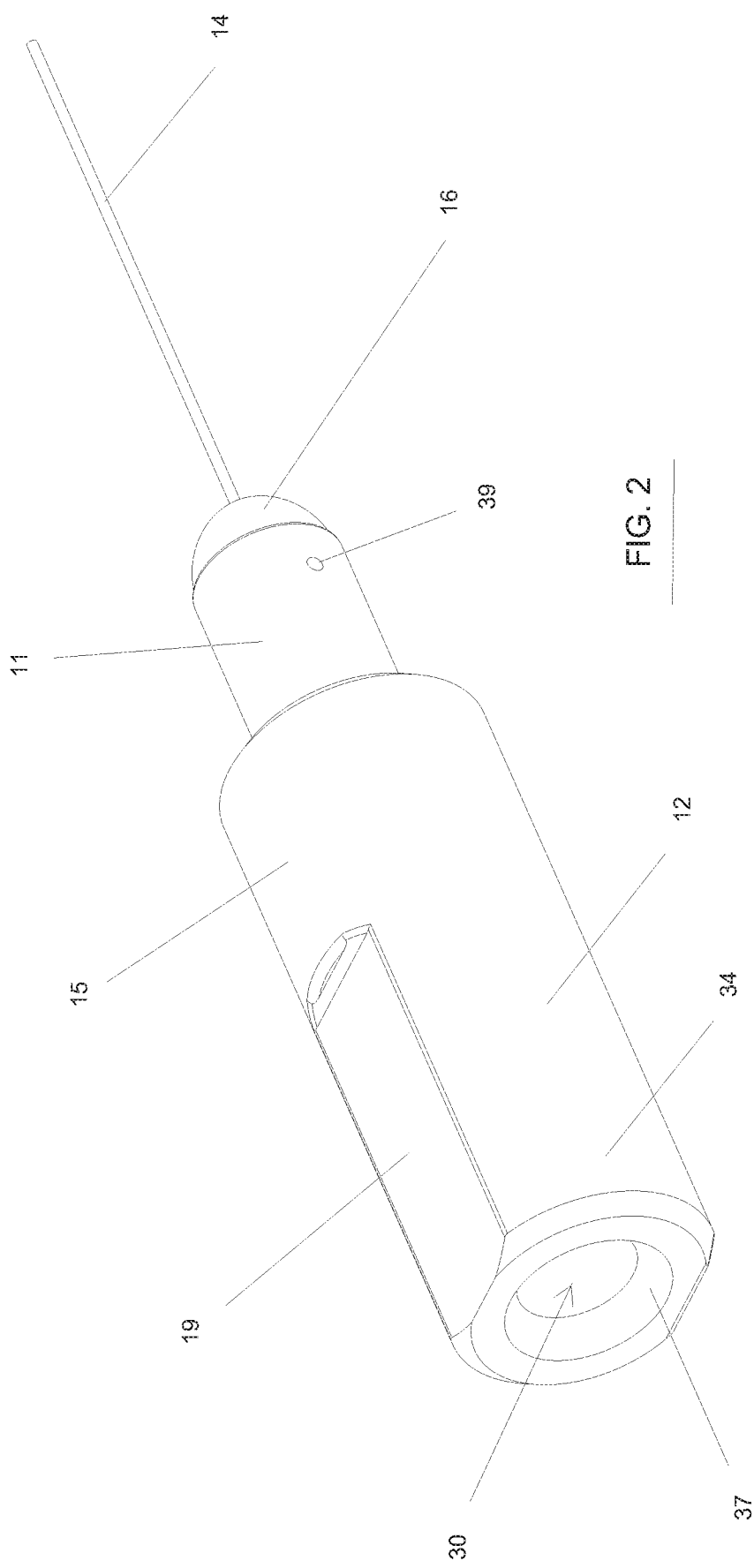
FIG. 2 is an enlarged perspective end view of the optical fiber stub and the receptacle cap shown in FIG. 1.

FIG. 2 is a perspective view of the optical fiber stub 10 and receptacle cap 12 shown in FIG. 1. Illustrated are the optical fiber 14, the support resin 16, the second end 11, the base end 15, and the receiving end 34 of the receptacle cap 12. The opening 30 of the inner tube of the receptacle cap 12 and the include edge 37 also are illustrated. Additionally, an indent marker 39 is included on the second end 11 of the optical fiber stub 10 to allow a user to visually rotate and align the angle on the end of fiber 14 to a receiving optical module into which the fiber stub body 10 is normally soldered with metal solder. The indent or notch 39 allows an angle of a cleave at the tip of the optical fiber 14 (not shown) be rotationally aligned by a user.

Figure 3:
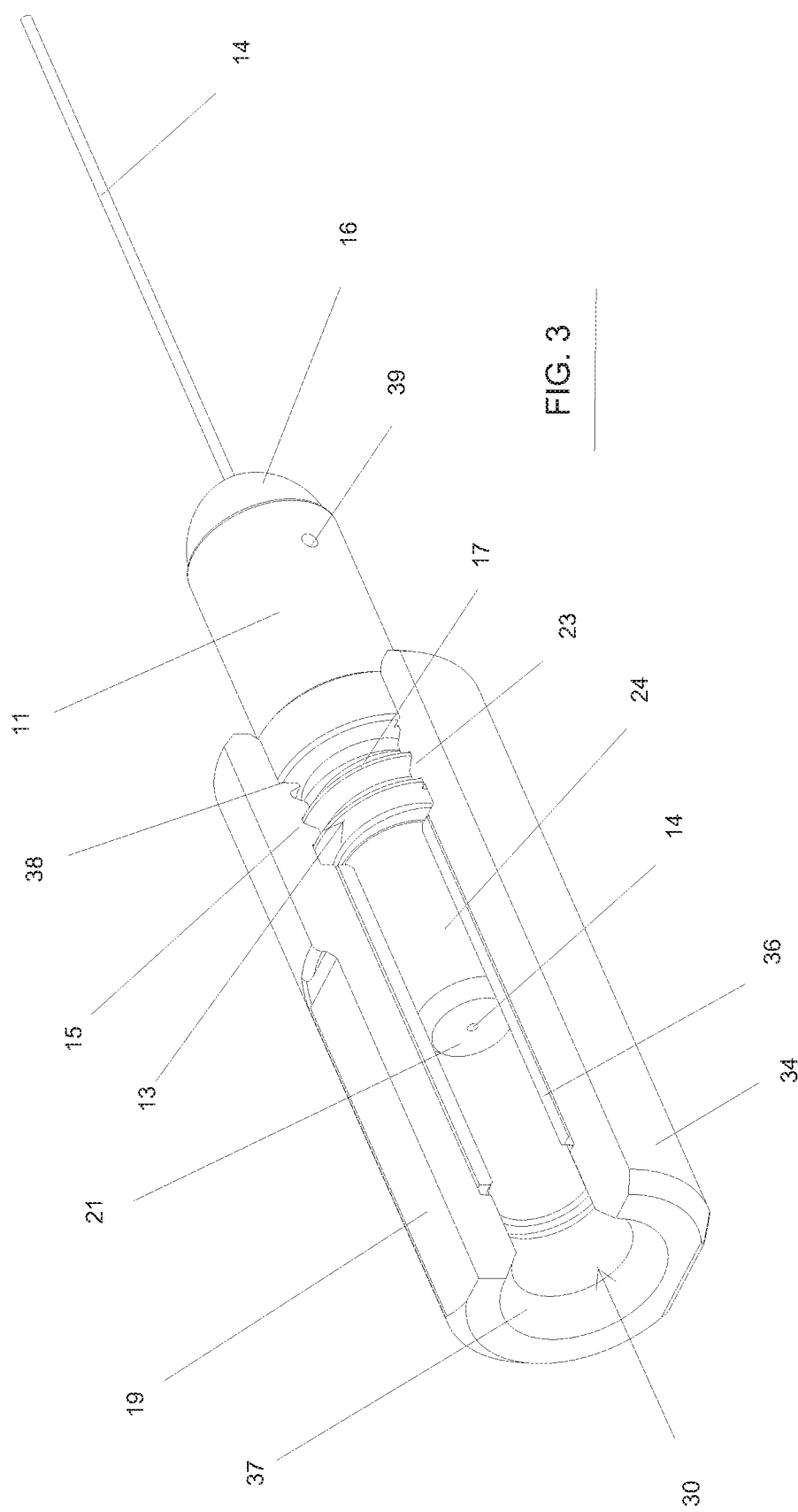
FIG. 3 is a cut away view of the optical fiber stub and the receptacle cap shown in FIG. 2.

FIG. 3 is a cut away view of the receptacle cap 12 shown in FIG. 2. Illustrated are the opening 30, sloped edge 37, flat surface 19, and optical fiber stub 10. Further illustrated are the end face 21 of the ferrule 24, the threaded outer surface 17 on the first end 13 of the optical fiber stub 10 and the threaded inner surface 23 of the base end 15 of the receptacle cap 12. The stop plate 38 and the notch 39 also are illustrated.

Referring now to the drawings, FIG. 4a is a side view of a hermetic fiber stub body 100 configured in accordance with another embodiment of the present invention. An optical fiber 140 and a ferrule 200 are connected to an opposing first or front end 150 and a second or back end 190 of the stub body 100. Support resin 160 is applied on top of a low melting point glass seal 240 (FIG. 4c) to support the mechanical transition of the optical fiber 140 exiting out of the glass seal 240. For the purpose of this application, low melting point glass is defined as glass having a melting point below 400 degrees Celsius. Without the support resin 16, the glass seal 240 and the optical fiber 140 transition or connection would be prone to breakage. The outer end or end face 210 of the ferrule 20 is tapered 220 for easier insertion into a split sleeve (not shown). The end-face 210 of the ferrule 200 and the optical fiber 140, which is glued within the ferrule 200, are both typically polished to a fine finish to allow an efficient optical connection to another connector interface via a split sleeve arrangement.

An indent marker 230 is used on the outer surface of the stub body 100 to allow a user to visually rotate and align the angle on the end of fiber 140 to a receiving optical module into which the stub body 100 is normally soldered with metal solder. Additionally, the indent marker 230 can be used to rotationally orientate stress rods of the optical fiber 140 to the module body 100 if the optical fiber 140 is a polarization maintaining optical fiber. The indent or notch 230 allows the angle of the cleave 250 shown in FIG. 1b at the tip 120 of the optical fiber 140 to be rotationally aligned by a user. It is important for the polarization maintaining (PM) fiber version, as that fiber has stress rods normally angularly aligned to the cleave 250 and the whole PM orientation of the finished assembly, which needs to be easily seen by a user. In a single mode (SM) version the indent 230 is used to enable a user to know which orientation the angled cleave 250 is relative to the whole body 100, as this can be difficult to determine.

FIG. 4b is an enlarged view of the end 120 of the optical fiber 140. The end 120 of the optical fiber 140 is cleaved, polished, cut or ablated at a slight angle 250 from being perpendicular to the longitudinal direction of the optical fiber 140 in order to prevent back reflection of optical signals being carried by the optical fiber 140. The end or tip 120 of optical fiber 140 also can be finished to be perpendicular to the longitudinal direction of the optical fiber 140 and anti-reflection coated at its tip 120 to reduce back reflections.

FIG. 4c is a cross-sectional view of the hermetic fiber stub body 100 shown in FIG. 4a. Illustrated are the optical fiber 140 and the support resin 160 for the glass hermetic seal 240. The support resin 160 is typically used to mechanically support the transition of the optic fiber 140 to air from the hard glass hermetic seal 240. The support resin 160 preferably is an acrylate type resin that is cured by ultraviolet (UV) light. Further illustrated in FIG. 4c is the optical fiber 140 extending completely through the stub body 100 and to the outer end 210 of the ferrule 200. The ferrule tip or end 210 may have a chamfer 220. A pass-through or smaller inner channel 170 is provided into which the optical fiber 140 is typically hermetically sealed with the glass seal 240, for example, which is low melting point glass. The smaller inner chamber 170 opens to the first end 150 of the stub body 100 via an aperture 270. A larger inner chamber 180 is shown within the stub body 100. The optical fiber 140 passes through the support resin 160, the glass seal 240, the channel 170, the inner chamber 180, and the ferrule 200. The hermetic glass seal 240 forms a hermetic seal around the optical fiber 140 between the support resin 160 and in the channel 170. The extension 360 of the stub body 100, epoxy resin 260, and vent slot or groove 300 also are shown in FIG. 4c, but will be described in more detail in regard to FIG. 5a.

FIG. 5a is an enlarged cross-sectional view of the end of the optical ferrule 200 within the hermetic stub body 100, and the optical fiber 140 shown in FIG. 4c. Further illustrated is the epoxy resin 260 used for optical fiber termination within the ferrule 200. The optical fiber 140 is shown extending into the stub body 100 and through the ferrule 200. The channel 180 is shown within the stub body 100. Chamfers or rounded ends 380 are included on the end 190 of extension 360 of the stub body 100. The vent slot or groove 300 is shown allowing gasses created at the opposing end of the fiber stub 100 to pass out of chamber 180 to the outside through a chamfer or bevel 320 at the outside end of the vent 300.

FIG. 5b is an enlarged end view of the assembly shown in and taken along line 5b-5b of FIG. 4a looking towards the ferrule end 220. In accordance with the present invention, Illustrated is the vent 300 between the chamfer 220 of the ferrule 200 and the bevel 320 on the extension 360 of the stub body 100. Also shown are the chamfer or rounded end 380 on the extension 360 of the stub body 100 and the optical fiber 140 within the ferrule 200.

In accordance with the present invention, a notch, groove, scallop, slot, or gas vent 300 is located between the extension 360 of the fiber stub body 100 and the ferrule 200. The gas vent 300 enables gas created during the hermetic glass sealing process of the low melting glass seal 240, as shown in FIG. 4c, to pass into the inner chambers 170 and 180 of the hermetic fiber stub body 100, exhausting safely past ferrule 200, through vent 300, and out bevel 320 without damaging the integrity of the hermetic glass seal material 240 during and after the hermetic glass sealing process.

A user will typically metal solder the stub body 100 into a hole or pipe in a module about half way along the length of the stub body 100. The metal solder hermetically seals the stub body 100 to the module wall within which the stub body 100 is to be located. The tip of the optical fiber 140 located within the ferrule 200 is then coupled to an emitter or detector, which is protected from the outside environment by the metal solder seal of the stub body 100 to a module box, and furthermore, outside elements or materials in the environment that may pass around the ferrule 200 and into the cavity 180, are then blocked from going into the stub body 100 by the glass seal 240.

Figure 6:
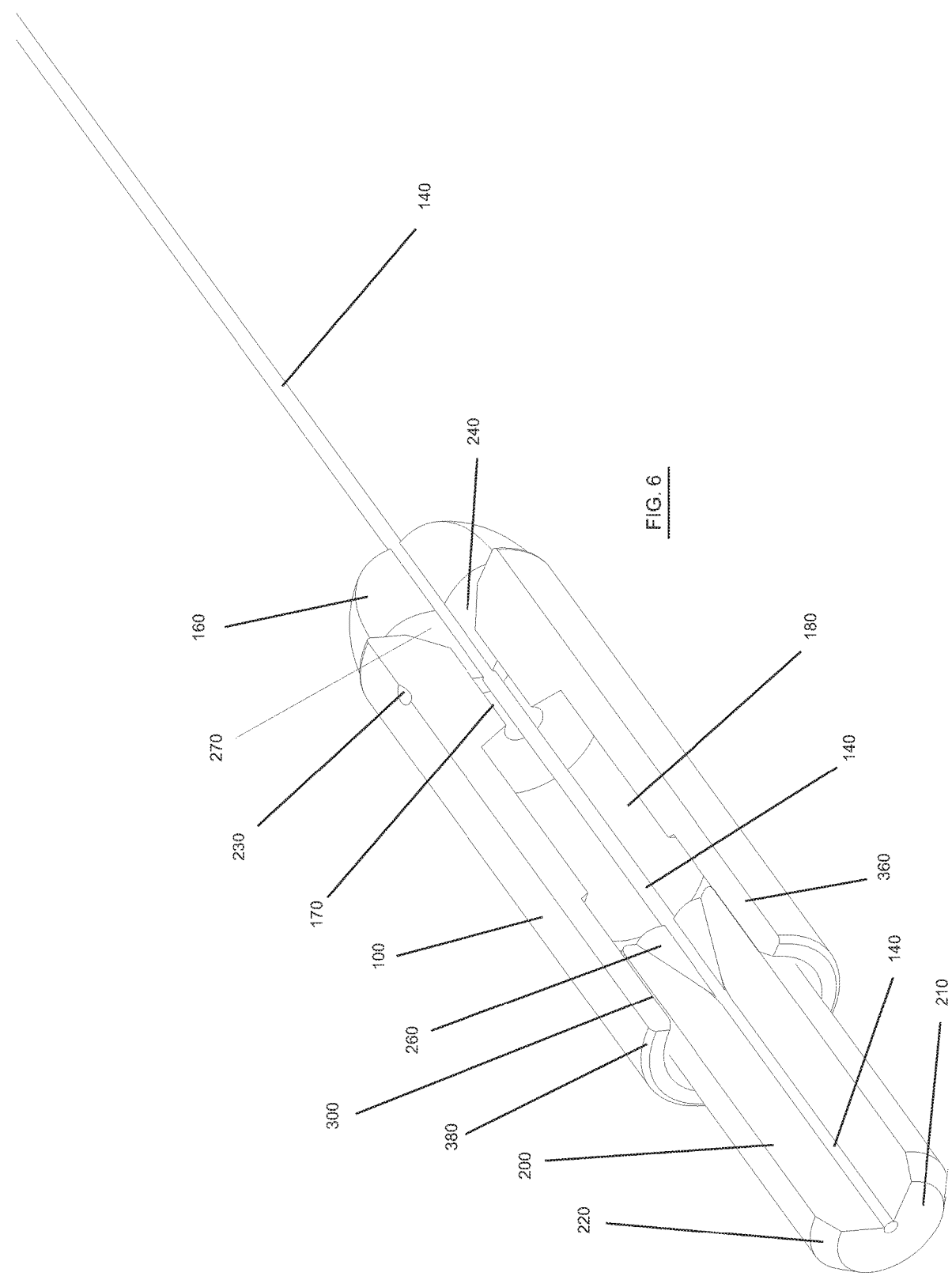

FIG. 6 is a cut away view of the hermetic stub body 100, the ferrule 200, and the optical fiber 140, shown in FIGS. 4a, 4c, 5a, and 5b. Also shown are the indent or notch 230, the outer end 210 and chamfer 220 of the ferrule 200, and the rounded end 380 of the extension 360 of the stub body 100. The smaller inner chamber 170 and the larger inner chamber 180 are shown, as well as the support resin 160, the hermetic glass seal 240, and the epoxy or resin 260 used for optical fiber termination. In accordance with the present invention, the gas vent 300 and bevel 320 at the outer end 190 of the extension 360 are further illustrated.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. An optical fiber stub assembly, comprising:
   a stub body having a first end and a second end, wherein an outer surface of the first end is threaded, and a stop surface at a base of the outer threaded surface;
   a receptacle cap having a tubular body with a base end and a receiving end, wherein an inner surface of the base end is similarly threaded to the outer threaded surface of the first end, so that the base end of the receptacle cap can be screwed over and around the first end of the stub body; and
   the base end of the receptacle cap is screwed over the first end of the stub body.

2. The optical fiber stub assembly of claim 1, wherein the receiving end of the receptacle cap includes two opposing flat surfaces on an outer surface of the receiving end, so as to enable a tool to grip the outer surface of the receiving end of the receptacle cap and unscrew the receptacle cap from the stub body.

3. The optical fiber stub assembly of claim 1, further comprising;
   an alignment sleeve within the tubular body for receiving and properly positioning an optical ferrule relative to the stub body.

* * * * *